United States Patent
Todori et al.

(10) Patent No.: US 7,469,083 B2
(45) Date of Patent: Dec. 23, 2008

(54) OPTICAL WAVEGUIDE

(75) Inventors: Kenji Todori, Yokohama (JP); Reiko Yoshimura, Kawasaki (JP); Tsukasa Tada, Hachioji (JP); Kou Yamada, Yokohama (JP); Miho Maruyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/049,662

(22) Filed: Mar. 17, 2008

(65) Prior Publication Data
US 2008/0240652 A1  Oct. 2, 2008

(30) Foreign Application Priority Data
Mar. 28, 2007  (JP) ............... 2007-085699

(51) Int. Cl.
  G02B 6/26  (2006.01)
  G02B 6/12  (2006.01)
  G02B 6/34  (2006.01)
(52) U.S. Cl. ............... 385/39; 385/14; 385/37
(58) Field of Classification Search ............... None
  See application file for complete search history.

(56) References Cited

U.S. PATENT DOCUMENTS

| 2006/0065902 A1 | 3/2006 | Todori et al. |
| 2006/0067602 A1 | 3/2006 | Todori et al. |
| 2006/0163556 A1 | 7/2006 | Yoshimura et al. |
| 2006/0279833 A1 | 12/2006 | Yoshimura et al. |
| 2007/0029544 A1* | 2/2007 | Estes et al. ............... 257/25 |
| 2007/0116420 A1* | 5/2007 | Estes et al. ............... 385/130 |

FOREIGN PATENT DOCUMENTS

| JP | 2004-20381 | 1/2004 |
| JP | 2004-157326 | 6/2004 |
| JP | 2006-171479 | 6/2006 |

OTHER PUBLICATIONS

U.S. Appl. No. 12/026,956, filed Feb. 6, 2008, Miho Maruyama, et al.
U.S. Appl. No. 11/690,989, filed Mar. 26, 2007, Kenji Todori, et al.
T. Yatsui et al., "Plasmon waveguide for optical far/near-field conversion" Applied Physics Letters, vol. 79, No. 27, Dec. 31, 2001, pp. 4583-4585.
Toshio Hukui et al., "Nanotechnology light foundation" ISBN: 4-1-19713-274, Dec. 2004, pp. 58-63 and two cover pages.

* cited by examiner

*Primary Examiner*—M. R. Connelly-Cushwa
(74) *Attorney, Agent, or Firm*—Oblon, Spivak, McClelland, Maier & Neustadt, P.C.

(57) ABSTRACT

An optical waveguide includes a propagating light waveguide, a coupler including a photonic crystal, and a surface plasmon waveguide, the propagating light waveguide, the coupler, and the surface plasmon waveguide being disposed in one plane along a waveguiding direction.

13 Claims, 6 Drawing Sheets

OPTICAL WAVEGUIDE

CROSS-REFERENCE TO RELATED APPLICATIONS

This application is based upon and claims the benefit of priority from prior Japanese Patent Application No. 2007-085699, filed Mar. 28, 2007, the entire contents of which are incorporated herein by reference.

BACKGROUND OF THE INVENTION

1. Field of the Invention

The present invention relates to an optical waveguide.

2. Description of the Related Art

In the background of increase in information processing capacity and enhancement of information processing speed, information delay and heat generation problem in electronic interconnections have occurred, and solutions for these problems are being demanded. Such solutions include an on-chip optical interconnection technology and use of light in information processing itself. One of the technologies of using light in information processing is the silicon photonics, e.g., high-speed silicon optical modulators, promoted by Intel. Demand for the on-chip optical interconnection technology is indicated in the technology roadmap for semiconductors.

Optical interconnections and optical waveguides are also demanded to be smaller in size, but there is generally a limit in fine processing of optical functional elements due to diffraction limit of light. An effective measure is the "near-field" technology. Research has been intensively made about an optical switch and a plasmon waveguide using near-field light. A fine optical interconnection such as an on-chip optical interconnection is expected to be realized by the near-field related technology. However, since a light-emitting device and external optical information processing components function with propagating light, not with near-field light, conversion between propagating light and near-field light is indispensable in the entire system. However, as is known from the dispersion relation between light and plasmon polariton, the dispersion relation does not coincide between the propagating light and near-field light. In other words, conservation of energy (or frequency) and conservation of momentum (or wave number) are not established at the same time, which is a problem of so-called phase mismatching. Accordingly, the conversion efficiency between the propagating light and near-field light is poor. For example, in a fiber probe of a near-field optical microscope, the wave number vector is broadened at the tip end and hence has many wave numbers, with which the energy is matched only at a specific wave number, thus deteriorating the conversion efficiency.

Figure 1:
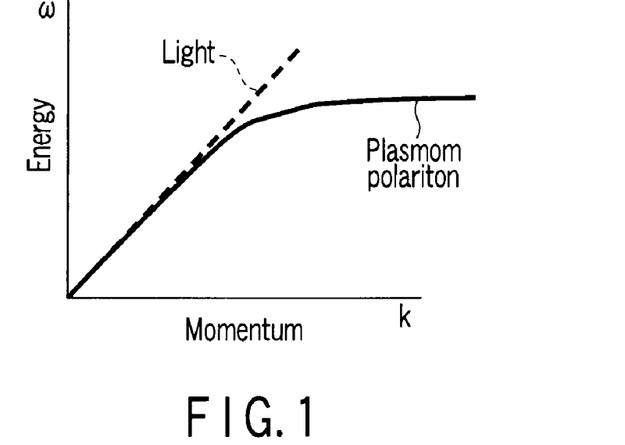
FIG. 1 is a diagram showing a dispersion curve of propagating light and surface plasmon polariton.

In an optical device for guiding surface plasmon polariton which is one of the near-field light, coupling efficiency with an optical device for guiding the propagating light is also an important problem. As shown in FIG. 1, it is generally known that the dispersion curves are different between propagating light and surface plasmon polariton on a metal thin film. Therefore, it is not easy to establish efficient conversion between the propagating light and surface plasmon polariton.

At the level of research or experiment, there are known, as efficient coupling methods of propagating light and surface plasmon polariton, ATR (attenuated total reflection) methods using a prism in an Otto configuration or Kretschmann configuration. These methods are designed to adjust the wave number depending on the incident angle, and the coupler on the basis of such principle has a three-dimensional structure. Another example is an apparatus which receives the propagating light in the surface plasmon waveguide through a three-dimensional optical system, such as a beam splitter and a reflector (see, for example, JP-A 2004-20381 (KOKAI)) or a lens (JP-A No. 2006-171479 (KOKAI)). However, an information processing system and an optical circuit have a two-dimensional structure, and if such a three-dimensional coupler is used, a planar waveguide system cannot be constructed, which is convenient for integration. Hence, there is a demand for a two-dimensional coupler which controls the wave number of propagating light and can be provided between the propagating light waveguide and the surface plasmon waveguide.

BRIEF SUMMARY OF THE INVENTION

According to an aspect of the present invention, there is provided an optical waveguide comprising: a propagating light waveguide; a coupler comprising a photonic crystal; and a surface plasmon waveguide, the propagating light waveguide, the coupler, and the surface plasmon waveguide being disposed in one plane along a waveguiding direction.

DETAILED DESCRIPTION OF THE INVENTION

The invention will be described in detail below.

For phase matching between propagating light and near-field light, the dispersion relation of propagating light or near-field light is adjusted. The dispersion relation can be changed, for example, by converting elementary excitation serving as an energy transfer medium (such as a photon, exciton, polariton, plasmon, or plasmon polariton), or by varying a refractive index through change of a propagating member. However, the elementary excitation interaction is poor in efficiency, and there is a difficulty that, in a case where the propagating member is changed, a material having an arbitrary refractive index cannot be freely selected.

In an embodiment of the invention, the coupler is formed by using a photonic crystal, and the dispersion relation of propagating light is varied. The photonic crystal is a crystal having a periodic structure of refractive index, and can modulate the dispersion relation of electromagnetic wave. Recently, successful control of the dispersion relation of propagating light by photonic crystal fiber, which is one of the photonic crystals, has been reported. Therefore, the photonic crystal fiber may be also used.

The photonic crystal shows fold-over of band, and the fold-over can be freely changed by adjusting the period of refractive index variation. Accordingly, between propagating light and surface plasmon polariton, there is indeed a coinciding point (that is, wavelength) between energy (or frequency) and momentum (or wave number). In the vicinity of the photonic band gap edge, the curvature of dispersion curve of propagating light may be possibly brought closer to that of the surface plasmon polariton. At such wavelength, it is possible to raise the coupling efficiency of propagating light and surface plasmon polariton.

Figure 2:
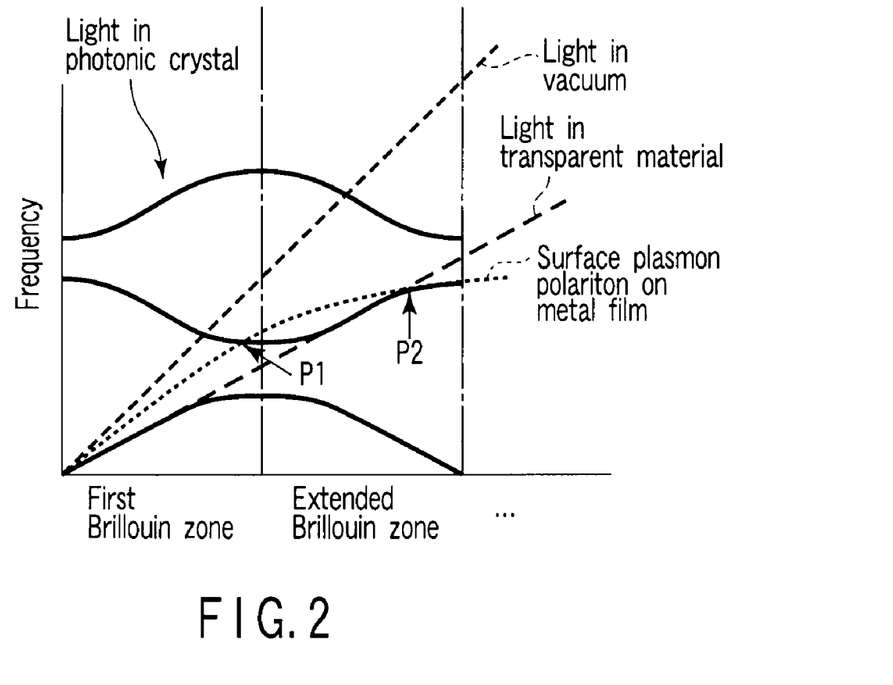
FIG. 2 is a diagram showing a dispersion curve of light in vacuum, dispersion curve of surface plasmon polariton on a metal thin film, dispersion curve of light in a transparent material, and dispersion curve of light in photonic crystal.

FIG. 2 shows a dispersion curve of light in vacuum, dispersion curve of surface plasmon polariton on a metal thin film, dispersion curve of light in a transparent material, and dispersion curve of light in photonic crystal. Referring to FIG. 2, the above discussion will be described again. Between the light in vacuum and the surface plasmon polariton on a metal thin film, the dispersion curves are different as mentioned above. By properly selecting the refractive index of the transparent material as a propagating member, as shown in FIG. 2, a coinciding point of energy and momentum of both is generated. It is, however, difficult to freely select a material having an arbitrary refractive index. By contrast, in the photonic crystal, since the fold-over of band can be freely changed, there is indeed a coinciding point (the intersection of two dispersion curves, P1 and P2 in FIG. 2) of energy and momentum between propagating light and near-field light.

The photonic crystal may have a two-dimensional or three-dimensional structure as long as the propagating light waveguide, coupler, and surface plasmon waveguide can be disposed in one plane along the waveguiding direction, but preferably has a one-dimensional structure due to easiness of fabrication.

The photonic crystal can be formed, for example, by alternately arraying a first transparent member having a first refractive index, and a second transparent member having a second refractive index.

By forming the coupler including the photonic crystal using a material capable of varying the refractive index by electron injection, and varying the refractive index of the material periodically, the adjusting function of propagating light can be enhanced. Specifically, the coupler is composed of a structural section including a material capable of varying the refractive index by electron injection, and pairs of electrodes disposed periodically at both sides of the structural section for injecting electrons selectively to a part of the structural section. In this case, a photonic crystal, including a portion having a first refractive index and a portion having a second refractive index arrayed alternately, is formed in the structural section by electron injection from the pairs of electrodes.

Generally, there is hardly any material capable of varying the refractive index enough to modulate the photonic band, but the following materials are known to vary the refractive index significantly by electron injection (see JP-A 2005-156922 (KOKAI), JP-A 2006-98753 (KOKAI), JP-A 2006-98996 (KOKAI), and JP-A 2006-201595 (KOKAI)). The structural section may be formed by using those materials as follows:

(1) A metallocene derivative having a metallocene skeleton substituted with an electron-attracting substituent X and an alkyl chain or an ether chain; a material comprising a combination of a cation of an element in which an electron shell of an occupied orbit is varied and an acceptor; a metal fine particle; a semiconductor fine particle; a fullerene molecule; or a fullerene derivative is varied largely in refractive index by electron injection. When the coupler is formed of the structural section containing such material, and pairs of electrodes disposed periodically at both sides of the structural section, the period of refractive index variation is adjusted by selective electron injection to the structural section, by which a photonic crystal can be reconstructed. Therefore, a photonic crystal having an optimum period of refractive index variation is provided while measuring the coupling efficiency of propagating light and surface plasmon polariton.

Herein, the electron-attracting substituent X to be introduced in the metallocene skeleton includes halogeno group, cyano group, nitro group, carboxyl group, alkylcarbonyl group, allylcarbonyl group, arylcarbonyl group, alkoxycarbonyl group, allyloxycarbonyl group, aryloxycarbonyl group, amido group, alkylamido group, allylamido group, arylamido group, alkoxyamido group, allyloxyamido group, aryloxyamido group, and sulfonic acid group or its salt. When the substituent has a hydrogen atom, this hydrogen atom may be also displaced by the above substituent, alkyl group, alkoxy group, allyloxy group, aryloxy group, alkoxyalkyl group, allyloxyalkyl group, or aryloxyalkyl group. From the viewpoint of change of wave number function at the time of electron injection to the metallocene derivative and stability of the injected electron, the electron-attracting substituent X is particularly preferred to be selected from the group consisting of nitro group, halogeno group, cyano group, acyl group, sulfo group, alkyl halide group, and aromatic hydrocarbon group or aromatic heterocyclic group substituted with such a substituent.

(2) The material comprising a combination of a cation of an element in which an electron shell of an occupied orbit is varied and an acceptor is expected to show a large polarizability variation because the electron shell (main quantum number) of the orbit to which an electron enters is varied by electron injection. Therefore, as in the case of (1), when the coupler is formed by using the structural section containing such materials, and pairs of electrodes disposed periodically at both sides of the structural section, an optimum photonic crystal can be provided.

The following includes examples of cations of group I and group II elements (Li, Na, K, Rb, Cs, Fr, Cu, Ag, Au, Be, Mg, Ca, Sr, Ba, Zn, Cd, Hg), and changes by electron injection to these cations.

$Li^+ \rightarrow Li\ Be^{2+} \rightarrow Be^+$ $Na^+ \rightarrow Na\ Mg^{2+} \rightarrow Mg^+$ $K^+ \rightarrow K\ Ca^{2+} \rightarrow Ca^+$ These cations exist stably when coupled with an acceptor group or acceptor molecule. The combination of a cation and an acceptor is expressed, for example, in formula of $(M^+)(A^-)$, $(M^{2+})(A^-)_2$, $(M^{2+})(A^{2-})$, or $(M^+)_2(A^{2-})$. The combination is not limited to these examples as long as the combination is finally made neutral when the entire positive and negative charges are canceled each other. If a plurality of M elements or A groups are present in one molecule, they may be either same or different.

Examples of the acceptor include an anion having one or more protons eliminated from an inorganic acid or an anion having one or more protons eliminated from an organic acid.

The inorganic acid includes at least one selected from the following group (A1).

(A1) Hydrochloric acid, sulfuric acid, sulfurous acid, carbonic acid, nitric acid, nitrous acid, hydroxide bromide, hydroxide iodide, fluoric acid, chloric acid, perchloric acid, chlorous acid, hypochlorous acid, cyanic acid, isocyanic acid, thiocyanic acid, hydrogen sulfide, prussic acid, arsenic acid, boric acid, phosphoric acid, orthosilicic acid, fulminic acid, hydroxide nitride, manganic acid, permanganic acid, chromic acid, and dichromic acid.

The organic acid includes at least one selected from the following group (A2).

(A2) A carboxylic acid compound such as acetic acid, benzoic acid, oxalic acid;

an alkoxycarboxylic acid compound such as ethoxyacetic acid, p-methoxybenzoic acid;

a hydroxycarboxylic acid compound such as lactic acid, citric acid, malic acid;

a thiocarboxylic acid compound such as thioacetic acid, thiobenzoic acid;

a dithio carboxylic acid compound such as dithioacetic acid, butane bis(dithio)acid;

a sulfonic acid compound such as ethane sulfonic acid, benzene sulfonic acid;

a sulfinic acid compound such as benzene sulfinic acid;

a sulfenic acid compound such as benzene sulfenic acid;

a phosphonic acid compound such as phenylphosphonic acid, methylphosphonic acid;

a phosphinic acid compound such as dimethylphosphinic acid, diphenylphosphinic acid;

a hydroxy compound such as ethanol, phenol;

a thiol compound such as thiomethanol, thiophenol;

a hydroxylamine compound such as hydroxylamine, N-phenyl hydroxylamine;

a hydroxamic acid compound such as acetohydroxamic acid, cyclohexane carbohydroxamic acid;

an oxime compound such as acetone oxime, benzophenone oxime;

an imide compound such as phthalimide, succinimide;

a hydroxyimide compound such as oxyiminoacetic acid, oxyiminomalonic acid, N-hydroxy phthalimide;

a carboxylic amide compound such as amide acetate, amide p-aminobenzoate;

a carboxylic hydrazide compound such as hydrazide acetate, benzohydrazide, 4-aminobenzoic hydrazide;

a porphyrin compound such as porphyrin, ethioporphyrin;

a phthalocyanine compound such as phthalocyanine; and a hydrazone compound such as benzaldehyde hydrazone, acetone hydrazone, 2-pyridinecarboaldehyde 2-pyridylhydrazone.

In the embodiments, the surface plasmon waveguide may be formed in various forms such as a thin film, thin wire, or dot line made of metal such as gold or silver. In particular, when the surface plasmon waveguide is formed by integrating metal particles two-dimensionally, absorption by bulk metal is reduced and the surface area is increased remarkably, and thus it is suited to the surface plasmon waveguide. The near-field light localizing on the surface of metal particles interacts only in a width of about its particle size. Therefore, when propagating near-field light by interaction between particles, the particles are brought closer to each other in a range of near-field light and integrated at high density. Specifically, metal particles are arranged at an interval shorter than the size of particle.

For such high-density integration of metal particles, metal particles having an organic ligand on the surface may be used. Such material has a core-shell structure consisting of a core of metal particle and a shell of organic ligand. In such a material, the metal particles can be reduced to a size of about 1 nm, and can be close-packed at high density. The dispersion curve of surface plasmon polariton of metal particles having an organic ligand on the surface is slightly different from the dispersion curve of surface plasmon polariton on a metal thin film, but both characteristics are estimated to be close to each other.

EXAMPLES

Example 1

Figure 3A:
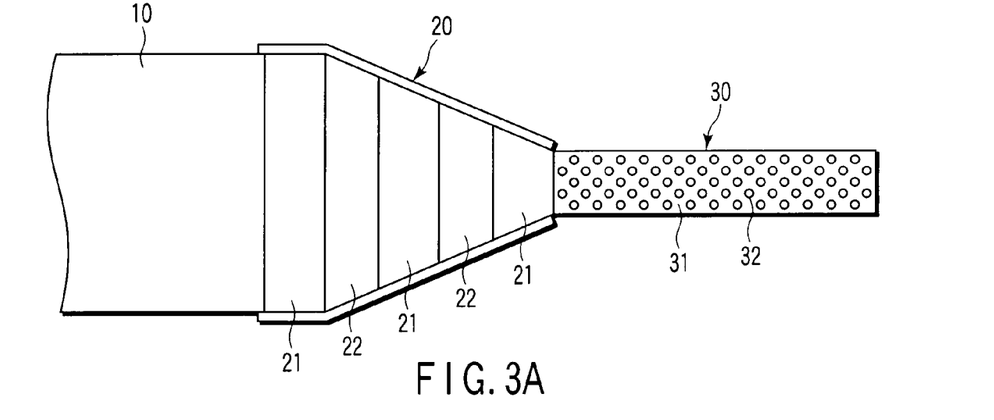
FIGS. 3A and 3B are a plan view and a cross-sectional view, respectively, of an optical waveguide in Example 1.
Figure 3B:
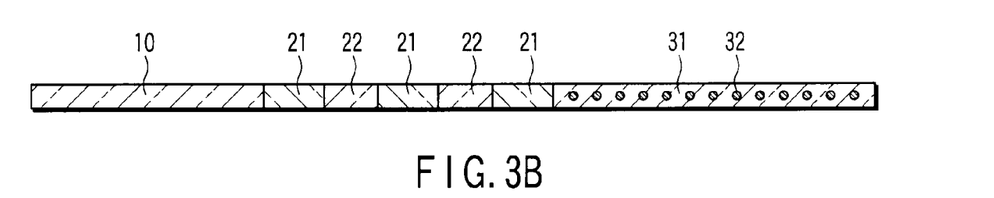

FIG. 3A is a plan view and FIG. 3B is a cross-sectional view of an optical waveguide in this example. In this optical waveguide, a propagating light waveguide 10, a coupler 20 including a one-dimensional photonic crystal, and a surface plasmon waveguide 30 are disposed in one plane along the waveguiding direction.

The propagating light waveguide 10 is a planar waveguide composed of $SiO_2$.

The coupler 20 has a periodic structure alternately arraying a first transparent member having first refractive index ($SiO_2$, refractive index 1.5) 21, and a second transparent member having second refractive index ($TiO_2$, refractive index 2.5) 22, being set at length ratio of 1:1, and has the overall length of 5 μm. When the length of one period including a set of first transparent member 21 and second transparent member 22 is changed by changing the length of each transparent member, the coupling intensity can be adjusted.

The surface plasmon waveguide 30 has a structure in which Au nanoparticles 31 of 20 nm in diameter are dispersed two-dimensionally in a dielectric material 32 of $SiO_2$. The width of the surface plasmon waveguide 30 is 120 nm. The surface plasmon waveguide 30 can be manufactured in the following method, for example. That is, the method comprises: sputtering an Au film on a substrate, forming patterns of Au nanoparticles 31 by electron beam lithography, and depositing a dielectric material 32 of $SiO_2$ on the entire surface, and then flattening the surface.

As a comparative example, by omitting the coupler 20 including the one-dimensional photonic crystal in FIGS. 3A and 3B, the propagating light waveguide 10 of $SiO_2$, and the surface plasmon waveguide 30 having the Au nanoparticles 31 dispersed in the dielectric material 32 of $SiO_2$ were directly coupled with each other, to fabricate an optical waveguide.

Figure 4:
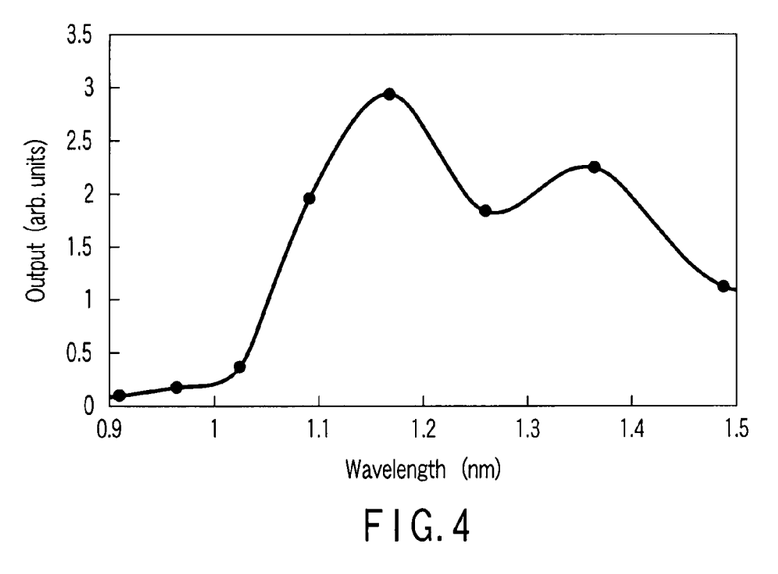
FIG. 4 is a spectral diagram of output light observed in the optical waveguide in comparative example.

First, in the optical waveguide of the comparative example, using laser of an optical parametric amplifier system, laser light was propagated through the propagating light waveguide 10, and the spectrum of the light emitted from the plasmon waveguide 30 was observed by using a near-field optical microscope of fiber probe type. Results are shown in FIG. 4. As is known from FIG. 4, a high output was provided at wavelength of 1.17 μm.

Figure 5:
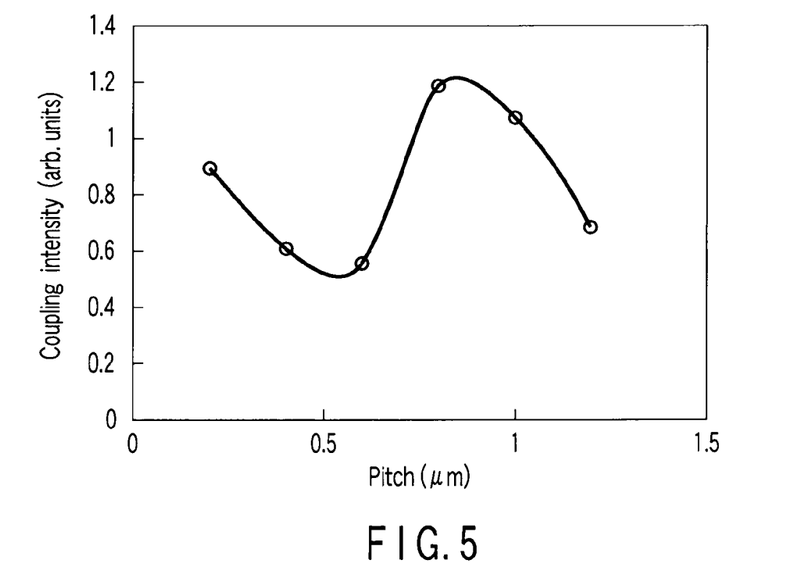
FIG. 5 is a diagram showing relation between a period of refractive index variation in a coupler and coupling intensity in the optical waveguide in Example 1.

Next, using an FDTD (finite difference time domain) simulator, the length of one period including one set of the first transparent member ($SiO_2$) 21 and the second transparent member ($TiO_2$) 22 in the coupler 20 was changed in various values to simulate a plurality of optical waveguides, for which the output was examined at wavelength of 1.17 μm and the ratio of the output to that of the comparative example was calculated. Results are shown in FIG. 5. As shown in FIG. 5, a high output (coupling intensity) was expected when the period is set to 800 nm (0.8 μm).

Actually, the optical waveguide manufactured by using the coupler 20 composed of the first transparent member ($SiO_2$) 21 and the second transparent member ($TiO_2$) 22 being 0.8 μm in the length of one period was found to be higher in output by about 20% than the optical waveguide of the comparative example omitting the coupler 20.

Figure 6:
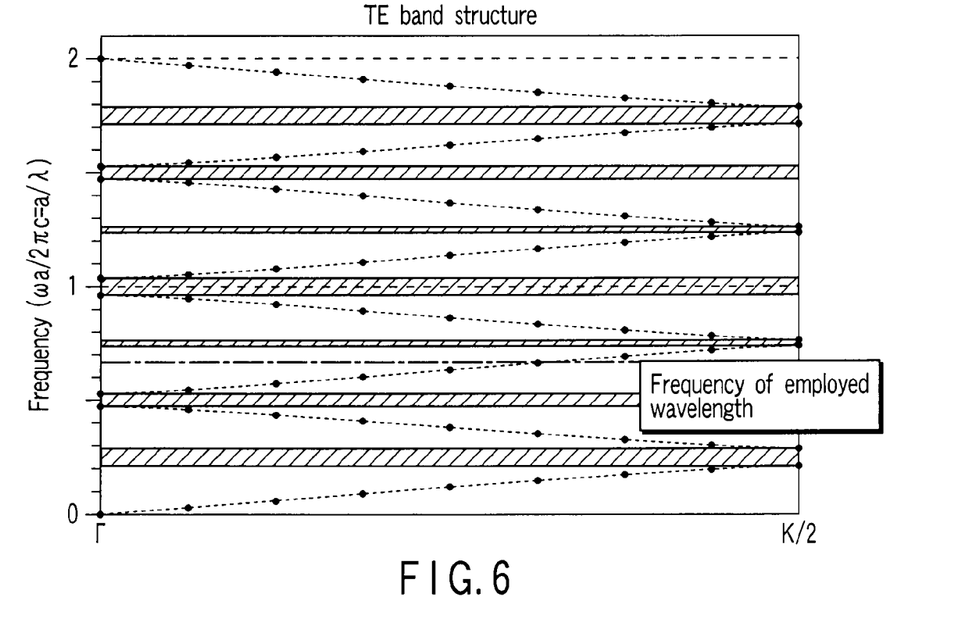
FIG. 6 is a photonic band diagram of the coupler in the optical waveguide in Example 1.

FIG. 6 shows results of calculation of photonic band in the coupler with the period of 0.8 μm. FIG. 6 shows a first Brillouin zone, and in a branch extended to a second Brillouin zone, it is estimated that the dispersion curve of propagating light coincides with the dispersion curve of surface plasmon polariton. The dispersion curve of the surface plasmon polariton in this example is based on Au nanoparticles in a dispersed state, and is hence different from the dispersion curve of the surface plasmon polariton on an Au thin film, and therefore cannot be calculated. It is, however, estimated to be closer to the dispersion curve of the surface plasmon polariton on an Au thin film.

In the photonic crystal having two transparent materials different in refractive index disposed alternately, the optical characteristic is modulated sufficiently if the transmittance can be changed by 1/e or more. Herein, "e" is a base of natural logarithm, and its value is about 2.72. To vary the transmittance by 1/e or more, the difference in refractive index between two transparent materials is preferably about 15% or more. In other words, the condition for sufficiently modulating the optical characteristics of the photonic crystal is the refractive index difference of 15% or more between the two materials. Thus, when using the photonic crystal capable of modulating the optical characteristic sufficiently, in this manner, by adjusting the length of one period including two transparent materials different in refractive index, the structure of the coupler may be designed appropriately so as to enhance the coupling intensity of propagating light and surface plasmon polariton.

For example, by using the first transparent material made of $SiO_2$ (glass, refractive index 1.5), supposing the refractive index of second transparent material to be $n_x$, and the thickness of the first transparent material (glass) is assumed to be equal to that of the second transparent material, occurrence of change of transmittance was calculated by varying the value of $n_x$. Here, the thickness of the two transparent materials is assumed to be 200 nm in both, and changes of transmission spectrum were examined by varying the value of $n_x$. In this case, the transmittance is changed at every specific interval of wavelength. When $n_x$ is 1.72, transmittance is about 35%, for example, at wavelength of about 430 nm. It means that the transmittance is about 1/e as physical quantity, and the optical characteristic of the photonic crystal seems to be modulated sufficiently. In this case, the difference between the refractive index (1.5) of the first transparent material (glass) and the refractive index ($n_x$=1.72) of the second transparent material is about 15%.

When $TiO_2$ (refractive index 2.5) is used instead of $SiO_2$ as the first transparent material, if the second transparent material of refractive index difference of 12.4% is used, similarly, the transmittance is about 1/e, for example, at wavelength of 710 nm. Generally, however, either one of the first and second transparent materials is composed of glass, or polymer having a refractive index nearly the same as that of glass, and therefore, the condition of refractive index difference of 15% or more between the two transparent materials is substantially effective.

In the embodiments of the invention, usable materials for the first and second transparent materials for forming the photonic crystal are shown in

TABLE 1

| Material | Refractive index | Transparent wavelength range (nm) |
|---|---|---|
| $SiO_2$ | 1.5 | 250-3000 |
| $TiO_2$ | 2.5 | 450-4000 |
| Si | 3.4 | 1300-6000 |
| GaAs | 2.7 | 1000-4000 |
| As + Se glass | 2.5 | 1000-10000 |
| Ge + Se + Te glass | 2.7 | 1000-15000 |
| $Al_2O_3$ | 1.7 | 200-5000 |
| Diamond | 2.4 | 250-2500 |
| ZnSe | 2.4 | 700-15000 |
| CdSe | 2.4 | 900-3000 |
| $As_2Se_3$ | 2.8 | 1000-10000 |
| CdTe | 2.8 | 1000-25000 |
| ZnS | 2.4 | 500-13000 |
| CdS | 2.2 | 1500-10000 |

The first and second transparent materials for forming the photonic crystal are required to be transparent at the wavelength of the operating light. On the other hand, the wavelength of the operating light depends on the output wavelength of the light source (semiconductor laser) or sensitivity characteristics of the photodetector. In commercial products of the semiconductor laser, the output wavelength ranges from 400 nm to 1550 nm. Of the photodetectors, the Si-based or InGaAs-based photodetector has sensitivity in a range of 320 nm to 1650 nm. A practical wavelength range is 400 nm to 1550 nm.

Example 2

An optical waveguide using a surface plasmon waveguide prepared by dispersing Ag nanoparticles, instead of Au nanoparticles in Example 1, two-dimensionally in the dielectric material made of $SiO_2$ will be described. The entire structure of the optical waveguide is the same as in FIGS. 3A and 3B.

Figure 7:
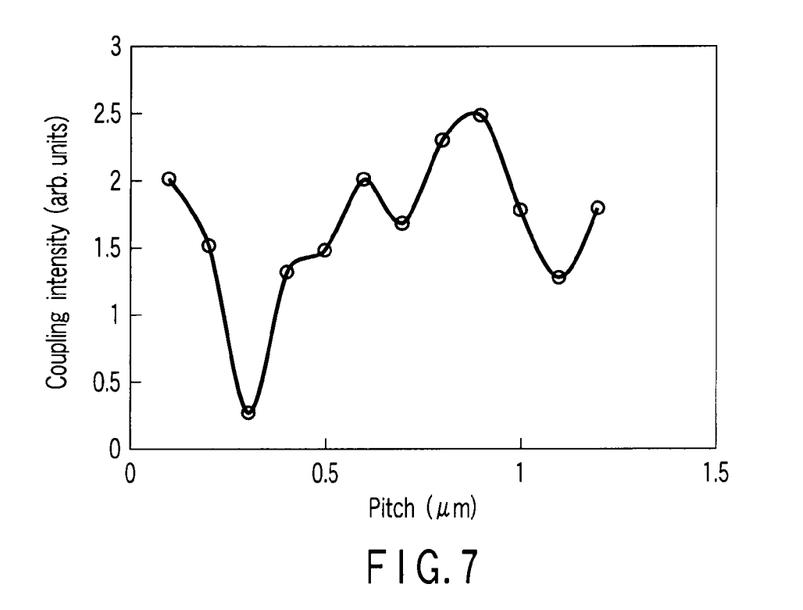
FIG. 7 is a diagram showing relation between a period of refractive index variation in a coupler and coupling intensity in the optical waveguide in Example 2.

Using an FDTD (finite difference time domain) simulator, the length of one period including one set of the first transparent member ($SiO_2$) 21 and the second transparent member ($TiO_2$) 22 in the coupler 20 was changed in various values to simulate a plurality of optical waveguides, for which the output (coupling intensity) was examined at wavelength of 1.1 μm and the ratio of the output to that of the comparative example was calculated. Results are shown in FIG. 7. As shown in FIG. 7, the output at a period of 900 nm (0.9 μm) was about 2.5 times as compared with that of the comparative example.

Actually, in the optical waveguide manufactured by using the coupler 20 composed of the first transparent member ($SiO_2$) 21 and the second transparent member ($TiO_2$) 22 being 0.9 μm in the length of one period, the output was about 2.5 times as compared with the optical waveguide of the comparative example omitting the coupler.

Figure 8:
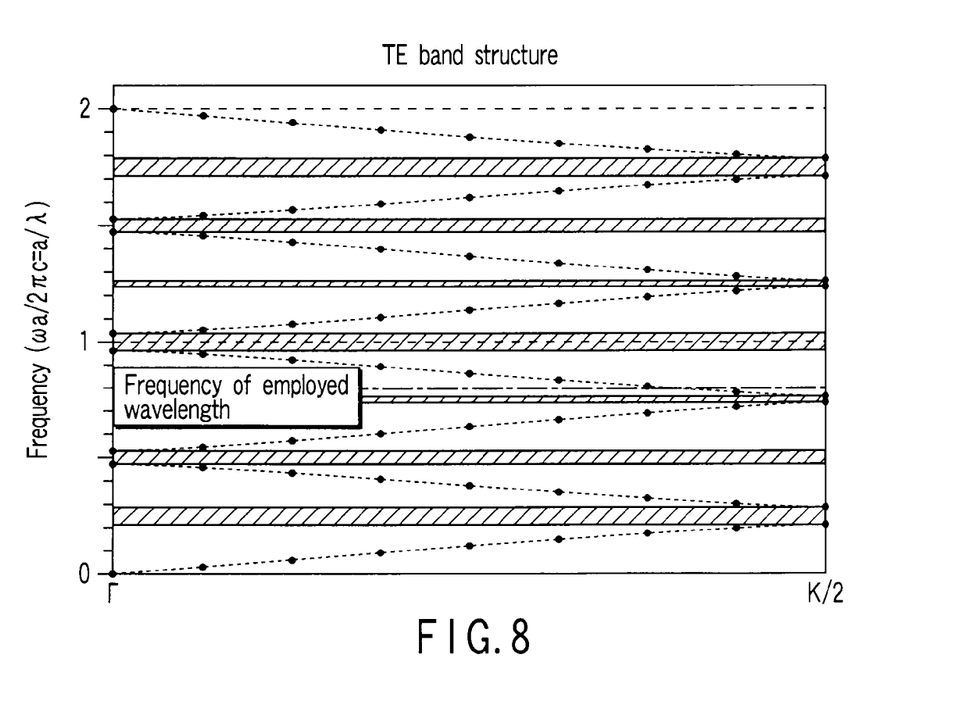
FIG. 8 is a photonic band diagram of the coupler in the optical waveguide in Example 2.

FIG. 8 shows results of calculation of photonic band in the coupler with the period of 0.9 μm. It shows the branch bending portion, near the band gap edge. It is estimated that the dispersion curve of propagating light is overlapped in many points with the dispersion curve of the band of surface plasmon polariton composed of Ag nanoparticles, and as a result it is estimated that the coupling intensity is further higher than in Example 1.

Example 3

Figure 9:
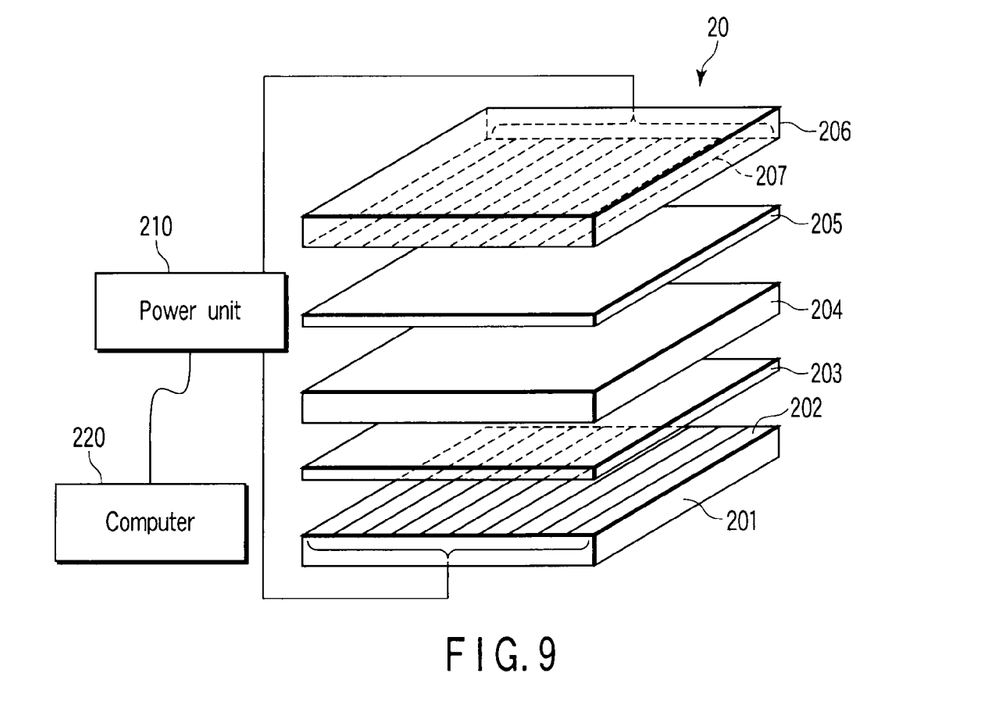
FIG. 9 is a perspective view of a coupler in the optical waveguide in Example 3.

In the optical waveguide of this example, the coupler 20 shown in FIG. 9 is used instead of the coupler containing $SiO_2$ and $TiO_2$ in Example 2.

As shown in FIG. 9, this is a stacked structure of a first glass substrate 201 having formed thereon electrodes 202 in stripes, a tunneling barrier layer 203, a structural section 204, a tunneling barrier layer 205, and a second glass substrate 206 having formed thereon electrodes 207 in stripes. The structural section 204 is formed by dispersing (4-nitrophenyl) ferrocene as a refractive index varying material in polyvinyl alcohol (PVA) at a concentration on the order of $10^{21}$ moles/$cm^3$. It is known that (4-nitrophenyl)ferrocene varies the refractive index by electron injection. The electrodes 202 and electrodes 207 form pairs, and are formed in stripes so as to sandwich the structural section 204. The electrodes 202 and electrodes 207 are connected to a power unit 210, which is controlled by a computer 220.

By the electrodes 202 and electrodes 207, the electron injection portions in the structural section 204, that is, the refractive index varying portions can be controlled, and the period of refractive index variation can be also adjusted. In the electron injection portions in the structural section 204, the maximum change of refractive index is about 20%. Thus, the structural section 204 can be used as a one-dimensional photonic crystal including a portion of first refractive index and a portion of second refractive index arrayed alternately.

The coupler 20 in FIG. 9 is used instead of the coupler in FIGS. 3A and 3B, and the propagating light waveguide 10, structural section 204, and surface plasmon waveguide 30 are disposed in one plane along the waveguiding direction, and the other structure of the optical waveguide is the same as that in FIGS. 3A and 3B.

Figure 10:
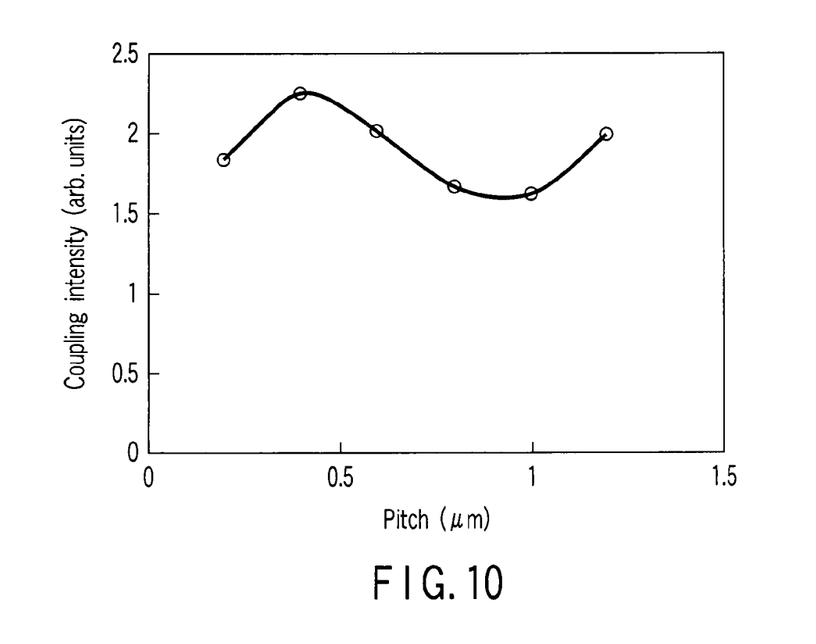
FIG. 10 is a diagram showing relation between a period of refractive index variation in a coupler and coupling intensity in the optical waveguide in Example 3.

Using an FDTD (finite difference time domain) simulator, the length of one period of refractive index variation in the coupler 20 was changed in various values to simulate a plurality of optical waveguides, for which the output (coupling intensity) was examined and the ratio of the output to that of the comparative example was calculated. Results are shown in FIG. 10. As shown in FIG. 10, the output at a period of 400 nm (0.4 μm) was about 2.3 times as compared with the output of the comparative example.

Actually, in the coupler 20 in FIG. 9, by controlling the electron injection portions in the structural section 204, when the length of one period of refractive index variation is set to 0.4 μm, it has been found that the output is about 2.3 times as compared with the optical waveguide of the comparative example omitting the coupler.

Figure 11:
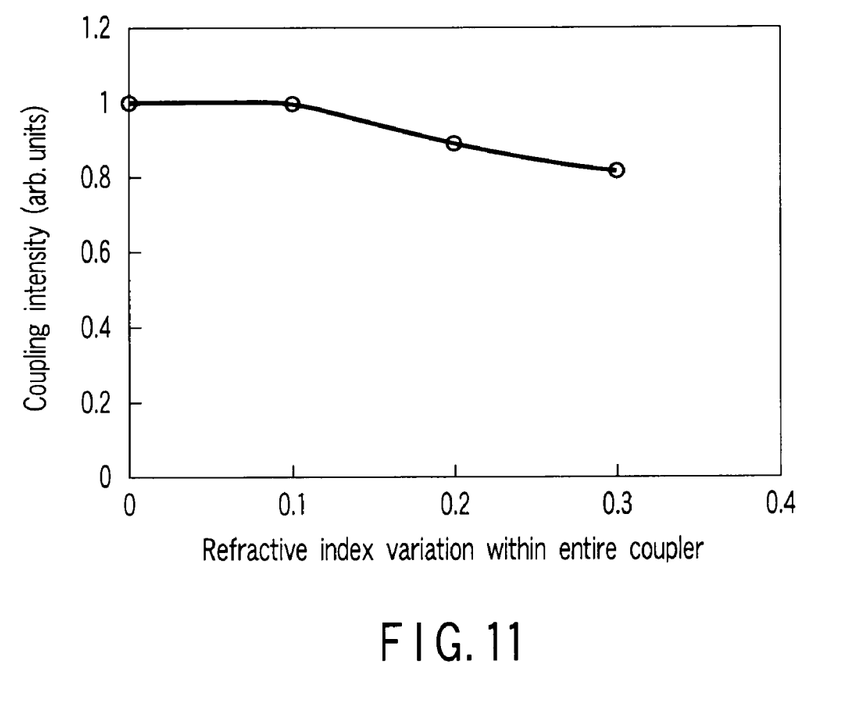
FIG. 11 is a diagram of coupling intensity in an optical waveguide having a coupler lacking a periodic structure of refractive index variation.

On the other hand, in a plurality of optical waveguides manufactured by using the coupler not having a periodic structure of refractive index variations and varying the refractive index of the entire coupler, the output light (coupling intensity) was examined and the ratio of the output to that of the comparative example was calculated. Results are shown in FIG. 11. The horizontal axis denotes the refractive index variation within the entire coupler. As is known from FIG. 11, the coupling intensity is not enhanced by merely varying the refractive index of the entire coupler.

Thus, in the optical waveguide of the example, as shown in FIG. 10, the effect is prominent by using the photonic crystal having periodicity of refractive index in the coupler.

Not limited to (4-nitrophenyl)ferrocene used in this example, similar effects are provided by forming the coupler as shown in FIG. 9 using other material large enough in variation of refractive index so as to influence the photonic band.

Example 4

In the surface plasmon waveguide, high waveguide loss is one of the important problems. The surface plasmon polariton is derived from polarization occurring due to vibration of collective free electrons on a metal surface, and it is a phenomenon occurring only on surface. By contrast, the waveguide loss is considered to be mainly caused by absorption by metal. The volume of the metal is related to absorption. Therefore, to enhance the excitation efficiency of surface plasmon polariton and decrease the absorption, it is effective to increase the ratio of the surface area of the meal to the volume. When metal particles are used in the surface plasmon waveguide, it is equivalent to reduce the particle size of the metal particles. On the other hand, it is known that the surface plasmon is not excited by metal particles of smaller than about 1 nm. Besides, the near-field interaction of surface plasmon or the like is known to be valid only in a range of particle size of metal particles. It is hence important to set the interval of metal particles shorter than the particle size.

Considering these points, it is known that metal particles used in the surface plasmon waveguide are defined by appropriate particle size and density. To adjust these parameters, it is effective to use metal particles having an organic ligand on the surface.

Optical waveguides were manufactured by using surface plasmon waveguides prepared by dispersing, instead of Au nanoparticles in Example 1, metal particles of about 5 nm in average particle size having an organic ligand on the surface shown in any of (a) to (e) two-dimensionally in the dielectric material of $SiO_2$.

(a) Au nanoparticles coupled with mercapto succinic acid;
(b) Au nanoparticles coupled with dodecanethiol;
(c) Au nanoparticles coupled with citric acid;
(d) Au nanoparticles coupled with triphenylphosphine; or
(e) Ag nanoparticles coupled with dodecanethiol.

As a result, in all the optical waveguides, as in Example 1, the coupling intensity was increased by about 20%. A substituent may also be introduced in the ligand.

When the average particle size of the metal particles was defined at 10 nm, the coupling intensity was increased by about 2%. However, if the average particle size of the metal particles was more than 10 nm, the coupling intensity was not improved so much. Therefore, a preferable range of average particle size of the metal particles used in the surface plasmon waveguide is 1 nm or more and 10 nm or less.

The density of the metal particles is desired to satisfy the following condition. Suppose filling spherical metal particles in the dielectric material at the same interval as the particle size in a simple cubic lattice, the density of metal particles is 6.54 vol %. Therefore, to induce surface plasmon, it is effective to fill the metal particles at a higher density than 6.54 vol %.

In this example, according to calculation based on small-angle X-ray analysis, the density of the metal particles was found to be about 12 vol %. This is a value influenced by the ligand size.

Example 5

An optical waveguide was manufactured by using a surface plasmon waveguide of Au thin wire measuring 8 μm in width and 20 nm in thickness, instead of the surface plasmon waveguide prepared by dispersing metal nanoparticles in $SiO_2$ in Example 3.

To this optical waveguide, OPO (optical parametric oscillator) light of Ti:S laser of the same wavelength 1.55 μm as used in optical communication was irradiated. As in Example 3, when the period of refractive index variation in the coupler was varied, the output was changed, and the coupling intensity was increased by about 10% at one period of refractive index variation of 3.5 µm.

Example 6

An optical waveguide was manufactured by using a surface plasmon waveguide formed of a dot line of metal particles, instead of the surface plasmon waveguide formed of Au thin wire in Example 5. Specifically, Au nanoparticles having a size of 40 nm and having the surface coupled with citric acid are arrayed in a line at central pitch of Au nanoparticles of about 60 nm (particle interval: 20 nm) using an atomic force microscope (AFM) to fabricate a surface plasmon waveguide having length of 12 µm. The interval between the terminal end or leading end of the coupler and the nearest Au nanoparticle was also set to 20 nm.

In this example, when one period of refractive index variation in the coupler was 3.8 µm, the coupling intensity was increased by about 8%.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical waveguide comprising:
a propagating light waveguide;
a coupler comprising a photonic crystal; and
a surface plasmon waveguide,
the propagating light waveguide, the coupler, and the surface plasmon waveguide being disposed in one plane along a waveguiding direction.

2. The optical waveguide according to claim 1, wherein the photonic crystal comprises a first transparent material having a first refractive index and a second transparent material having a second refractive index arrayed alternately.

3. The optical waveguide according to claim 2, wherein a refractive index difference between the first transparent material and the second transparent material is 15% or more.

4. The optical waveguide according to claim 1,
wherein the coupler comprises: a structural section comprising at least one selected from the group consisting of a metallocene derivative having a metallocene skeleton substituted with an electron-attracting substituent and an alkyl chain or an ether chain, a material comprising a combination of a cation of an element in which an electron shell of an occupied orbit is varied and an acceptor, a metal fine particle, a semiconductor fine particle, a fullerene molecule, and a fullerene derivative; and pairs of electrodes disposed periodically at both sides of the structural section, for selectively injecting electrons in a part of the structural section,
and wherein the structural section forms the photonic crystal comprising a portion having a first refractive index and a portion having a second refractive index arrayed alternately by electron injection from the pairs of electrodes.

5. The optical waveguide according to claim 1, wherein the surface plasmon waveguide comprises metal particles arranged at an interval shorter than a size of the particle.

6. The optical waveguide according to claim 5, wherein the metal particles are formed of gold or silver.

7. The optical waveguide according to claim 5, wherein the metal particles are dispersed in a dielectric material.

8. The optical waveguide according to claim 5, wherein the metal particles are arrayed two-dimensionally.

9. The optical waveguide according to claim 5, wherein the metal particles are arrayed one-dimensionally.

10. The optical waveguide according to claim 5, wherein the metal particles have an organic ligand on their surface.

11. The optical waveguide according to claim 10, wherein the organic ligand is selected from the group consisting of mercapto succinic acid, alkane thiol, citric acid, and triphenyl phosphine.

12. The optical waveguide according to claim 1, wherein the surface plasmon waveguide comprises a metal wire.

13. The optical waveguide according to claim 12, wherein the metal wire is formed of gold or silver.

* * * * *